(12) United States Patent
Suman et al.

(10) Patent No.: US 11,048,898 B2
(45) Date of Patent: Jun. 29, 2021

(54) CODED INFORMATION READER

(71) Applicant: Datalogic IP Tech S.r.l., Lippo di Calderara di Reno (IT)

(72) Inventors: Michele Suman, Ponte San Nicolo (IT); Davide Bruni, Bologna (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 0 days.

(21) Appl. No.: 16/065,407

(22) PCT Filed: Dec. 24, 2015

(86) PCT No.: PCT/IT2015/000320
§ 371 (c)(1),
(2) Date: Jun. 22, 2018

(87) PCT Pub. No.: WO2017/109801
PCT Pub. Date: Jun. 29, 2017

(65) Prior Publication Data
US 2019/0005286 A1    Jan. 3, 2019

(51) Int. Cl.
*G06K 7/10* (2006.01)
*G06K 7/14* (2006.01)

(52) U.S. Cl.
CPC ....... *G06K 7/10752* (2013.01); *G06K 7/1092* (2013.01); *G06K 7/10732* (2013.01);
(Continued)

(58) Field of Classification Search
CPC ............ G06K 7/10752; G06K 7/1465; G06K 7/10732; G06K 7/10861; G06K 7/10841; G06K 7/1092
(Continued)

(56) References Cited

U.S. PATENT DOCUMENTS 5,365,597 A    11/1994  Holeva
6,236,735 B1    5/2001  Bjorner et al.
(Continued)

FOREIGN PATENT DOCUMENTS

CN    1492785 A    4/2004
CN    102326187 A    1/2012
(Continued)

OTHER PUBLICATIONS

International Search Report and Written Opinion dated Nov. 11, 2016 in International Patent Application No. PCT/IT2015/000320, 11 pages.
(Continued)

*Primary Examiner* — Matthew Mikels
(74) *Attorney, Agent, or Firm* — Shook, Hardy & Bacon, L.L.P.

(57) ABSTRACT

Coded information reader (1) for reading coded information (6) from an object, comprising a first camera assembly (10) having a first resolution, a first frame rate and a first field of view (18), and a second camera assembly (20) having a second resolution, a second frame rate and a second field of view (28), wherein the first resolution is lower than the second resolution and the first frame rate is higher than the second frame rate. The first camera assembly (10) is configured to acquire frames and to process the acquired frames to perform: —detection of object presence, —determination of operating parameters for both the first camera assembly (10) and the second camera assembly (20), —coded information decoding, —in case of failure of said coded information decoding, triggering of the second camera assembly (20) to acquire frames and to process the acquired frames to perform coded information decoding with the operating parameters set as determined by the first camera assembly (10) for the second camera assembly (20).

19 Claims, 5 Drawing Sheets

(52) U.S. Cl.
CPC ..... G06K 7/10841 (2013.01); G06K 7/10861 (2013.01); G06K 7/1465 (2013.01)

(58) Field of Classification Search
USPC .................................. 235/435, 439, 454, 462
See application file for complete search history.

(56) References Cited

U.S. PATENT DOCUMENTS

| | | | |
|---|---|---|---|
| 7,040,538 | B2 | 5/2006 | Patel et al. |
| 7,533,819 | B2 | 5/2009 | Barkan et al. |
| 8,571,298 | B2 | 10/2013 | McQueen et al. |
| 8,783,573 | B2 | 7/2014 | Havens et al. |
| D737,822 | S | 9/2015 | Mistkawi et al. |
| 9,609,331 | B2 | 3/2017 | Liang et al. |
| 2003/0016297 | A1 | 1/2003 | Shigeta |
| 2008/0179402 | A1 | 7/2008 | Barkan et al. |
| 2009/0084854 | A1* | 4/2009 | Carlson .............. G06K 7/10722 235/462.41 |
| 2010/0158310 | A1 | 6/2010 | McQueen et al. |
| 2012/0075436 | A1 | 3/2012 | Chen et al. |
| 2013/0062411 | A1* | 3/2013 | Nunnink .................. G06K 7/14 235/454 |
| 2013/0306727 | A1 | 11/2013 | Shearin et al. |
| 2014/0063229 | A1* | 3/2014 | Olsson ................. H04N 5/2252 348/84 |
| 2015/0365675 | A1* | 12/2015 | Liang ................... H04N 19/513 375/240.25 |

FOREIGN PATENT DOCUMENTS

| | | |
|---|---|---|
| CN | 102907092 A | 1/2013 |
| CN | 103155571 A | 6/2013 |
| CN | 104796609 A | 7/2015 |
| JP | 11353459 A | 12/1999 |
| WO | 02/057030 A1 | 7/2002 |
| WO | 2017109801 A1 | 6/2017 |

OTHER PUBLICATIONS

Mao-Hua, Z., et al., "Design of Holographic Scanner in Laser Scanner Imaging System", Journal of Liaoning Normal University (Natural Science Edition), vol. 25, No. 2, pp. 136-138 (Jun. 2002) (English Translation Submitted).

Xu, Z. et al., "Novel Vehicle Detection System Based on Line Scan Camera", The Ninth International Conference on Electronic Measurement & Instruments, IEEE, pp. 748-751 (2009).

First Office Action and Search received for Chinese Patent Application No. 201580085801.5, dated Jan. 6, 2021, 21 pages.

\* cited by examiner

CODED INFORMATION READER

This application claims priority to PCT/IT2015/000320, filed Dec. 24, 2015, entitled "Coded Information Reader," which is incorporated in its entirety by reference herein.

The present invention relates to a coded information reader.

The present invention also relates to a method for reading coded information.

In the present description and claims, the expression "coded information" is used to indicate information contained in a code, preferably an optical code. The term "code" is used to indicate any graphical representation having the function of storing said coded information. The expression "optical code" comprises graphical representations, which are detectable in the field of visible light and, preferably, also in the range of wavelengths comprised between infrared and ultraviolet.

Particular examples of optical code consist of linear or two-dimensional codes, wherein the information is coded through suitable combinations of elements with a predetermined shape, for example squared, rectangular or hexagonal, of dark color (usually black) separated by clear elements (spaces, usually white), such as barcodes, stacked codes, two-dimensional codes in general, color codes, etc. The term optical code further comprises, more generally, also other graphical patterns with information coding function, including clear printed characters (letters, numbers, etc.) and special patterns (such as stamps, logos, signatures, fingerprints, etc.).

The coded information may relate, for example, to distance, volume, overall dimensions, or identification data of an object.

Coded information readers are of various types; they may be based on laser technology or imaging technology.

Furthermore, coded information readers may be intended for handheld use (portable readers), or to be fixedly resting in a predetermined position (fixed position readers). Fixed position readers are in turn classified as on-counter and in-counter readers, the former being those typically resting on the top of a surface, which is usually the check counter surface, the latter being commonly integrated in the check counter and oriented so that its reading field projects from the check counter surface towards the user or operator.

On-counter readers are also sometimes referred to as "presentation scanners", due to the fact that the user grabs the object to be identified, typically a good or a document of any type, and moves her/his hand towards the terminal reading face, thus "presenting" the object to be read to it.

In-counter readers are also sometimes called "flatbed scanners", because the reading window lies flush with the counter surface, or, "vertical scanners" when the reading window lies in a substantially vertical plane facing the operator, or else, "bi-optic scanners" when both configurations—flatbed and vertical—are simultaneously present.

U.S. Pat. No. 7,533,819 discloses an imaging system for an imaging-based bar code reader having a housing and a window. The imaging system includes a dual camera assembly having a first camera assembly with a first field of view and a second camera assembly with a second field of view. The first field of view and the second field of view are overlapping upon exiting the window and are substantially congruent outside the housing. The first camera assembly comprises a 2D sensor array using a global shutter pixel readout structure such as a VGA sensor with array size on the order of 640×480 pixels. The second camera assembly includes a 2D mega pixel sensor array adapted to provide high resolution imaging of 2D target bar codes, with array size on the order of 1280×1024 pixels and using a rolling shutter pixel readout structure. In operation, the first camera is continuously operated. If the imaging and decoding systems detect a 2D bar code that cannot be read, the first camera module is turned off and the second camera module is activated until the 2D bar code is successfully imaged and decoded.

US 2003/0016297 discloses an image sensing apparatus comprising a single sensor which generates an image signal of an object. In operation, a bar code on a printed matter is sensed at a low resolution; a microcomputer performs exposure adjustment and focus adjustment on the basis of a low-resolution image signal from the sensor; after the adjustment is completed, the resolution is switched from a low resolution to a high resolution and the image of the bar code in input to the bar code reader main body is decoded. After completion of decoding, the resolution is switched back from high resolution to low resolution. The reading time of an image signal of a frame image from the sensor is set in advance as a fixed frame reading time and one image is read every frame reading time regardless of the resolution.

The Applicant observes that the imaging system of U.S. Pat. No. 7,533,819 does not enable to efficiently exploit the dual camera assembly. Indeed, the two cameras are operated independently so that each camera needs a time to adjust the camera gain, exposure time and/or illumination, and a time for decoding. In other word, only part of the field of view of each camera is exploited for decoding so that there is the risk that an optical code flies away from the camera field of view without being decoded yet. Moreover, in the imaging system of U.S. Pat. No. 7,533,819 a distinct sensor to detect object presence is required.

As stated above, US 2003/0016297 teaches to adjust exposure and focus on the basis of a low-resolution image signal from the sensor; and—after the adjustment is completed—to switch the resolution from a low resolution to a high resolution so as to decode the image of the bar code on the basis of a high-resolution image signal from the sensor. The Applicant notes that in this solution, which makes use of a single sensor, there is a waste of time due to the time required for switching the resolution from low resolution to high resolution. Moreover, as the frame reading time is the same regardless of the resolution, the speed capacity of the low resolution operation is not exploited. Furthermore, as a single sensor is used, the field of view crossed by the bar code during low-resolution and high-resolution reading is the same, so that only part of the field of view of the sensor is exploited for decoding on the basis of a high-resolution image signal.

The Applicant thus faced the technical problem of providing an improved coded information reader.

In particular, the Applicant faced the technical problem of providing a coded information reader that guarantees improved performances as far as concerns reader responsivity (in terms of average time to decode and average number of successful decoding) while preserving high-resolution capability.

The Applicant found that the above technical problem can be solved by using two cameras: a low resolution camera and a high resolution camera, wherein the low resolution camera is faster in that it has a frame rate higher than the high resolution camera and is exploited in order to quickly detect object presence, adjust gain/exposure time/illumination values for both cameras, attempt decoding, and, in case of unsuccessful decoding, trigger the high resolution camera for decoding. This advantageously enables to exploit the low resolution (fast) camera to quickly perform all the operations needed by both cameras to perform decoding so that, when necessary, the high resolution camera is efficiently exploited for decoding operation only (without wasting time to perform said operations). This is based on the Applicant's perception that the fast, low resolution camera can be efficiently exploited to determine the operating parameters of the high resolution camera too, taking into consideration that the ambient light conditions are substantially the same for the two cameras (that operate, as a whole, in few hundredths of a second) and that a suitable calibration procedure (that may be performed in a manufacturing phase or an initial set-up phase of the reader) can be set (taking into account the peculiarities of the high resolution camera with respect to the fast, low resolution camera) for deriving the operating parameters of the high resolution camera from the ones determined by the fast, low resolution camera.

In a first aspect, the present invention thus relates to a coded information reader for reading coded information from an object, comprising:

a first camera assembly having a first resolution, a first frame rate and a first field of view;

a second camera assembly having a second resolution, a second frame rate and a second field of view, the first resolution being lower than the second resolution and the first frame rate being higher than the second frame rate, wherein said first camera assembly is configured to acquire frames and to process the acquired frames to perform:

detection of object presence, determination of operating parameters for both the first camera assembly and the second camera assembly, coded information decoding, in case of failure of said coded information decoding, triggering of the second camera assembly to acquire frames and to process the acquired frames to perform coded information decoding with the operating parameters set as determined by the first camera assembly for the second camera assembly.

In a second aspect, the present invention thus relates to method for reading coded information from an object, comprising the steps of:

a) acquiring first frames at a first resolution and at a first frame rate with a first camera assembly;

b) processing the acquired first frames so as to perform the steps of:

b1) detecting object presence, and, in case of object presence detected:

b2) determining operating parameters for the first camera assembly and for a second camera assembly, and b3) decoding coded information, c) in case of failure of step b3) of coded information decoding, setting the operating parameters of the second camera assembly as determined in step b2) and triggering acquisition of second frames at a second resolution and at a second frame rate by the second camera assembly, the first resolution being lower than the second resolution and the first frame rate being higher than the second frame rate;

d) processing the second frames acquired in step c) so as to perform coded information decoding.

The present invention in at least one of the aforementioned aspects can have at least one of the following preferred characteristics.

Preferably, the operating parameters are at least one of: gain, exposure time and illumination level.

Preferably, the operating parameters for the first camera assembly are determined by analyzing pixels of the frames acquired by the first camera assembly, which cover said first field of view.

Preferably, the operating parameters for the second camera assembly are determined by analyzing pixels of the frames acquired by the first camera assembly, which cover said second field of view.

Preferably, the first field of view and the second field of view overlap at least in part.

Preferably, the first field of view is comprised between 40° and 70°.

Preferably, the second field of view is comprised between 40° and 60°.

In a preferred embodiment, the second field of view is smaller than the first field of view.

Preferably, a major part of the or substantially the whole second field of view is comprised within the first field of view.

Preferably, the ratio between the first field of view and the second field of view is comprised between 1 and 1.5.

According to another embodiment, the first field of view and the second field of view are substantially the same and are substantially overlapping.

Preferably, the first camera assembly and the second camera assembly respectively have a first imaging sensor and a second imaging sensor, distinct to each other.

Preferably, the gain and/or the exposure time for the first camera assembly and for the second camera assembly are the gain and/or the exposure time of the first imaging sensor and a second imaging sensor, respectively.

Preferably, the first imaging sensor and the second imaging sensor are 2D sensors.

Preferably, the first imaging sensor is a VGA or WVGA global shutter sensor.

Preferably, the second imaging sensor is a mega pixel imaging sensor.

Preferably the first resolution is a resolution of a VGA sensor (that is, up to 640×480 pixels) or of a WVGA global shutter sensor (that is up to 800×480 pixels).

Preferably, the second resolution is a resolution of a megapixel imaging sensor or higher resolution imaging sensor. More preferably, the second resolution denotes a resolution at least equal to 1024×768 (XVGA sensor), more preferably at least equal to 1280×1024 pixels.

Preferably, the first frame rate is at least equal to 100 fps.

Preferably, the second frame rate is lower than 100 fps.

In a preferred embodiment, the first camera assembly is configured to perform at least one operation among: localization of coded information position and determination of coded information speed.

Preferably, the second camera assembly is configured to perform coded information decoding by using the coded information position localized by the first camera assembly and/or by using the coded information speed determined by the first camera assembly.

Preferably, the object is moving with respect to the coded information reader.

Preferably, the coded information reader is a fixed position reader.

Preferably, said first camera assembly is configured to trigger the second camera assembly when the object enters or approaches the second field of view of the second camera assembly (if coded information position is localized by the first camera assembly) or after lapse of a predetermined period of time from object presence detection. Preferably, said first camera assembly is configured to trigger the second camera assembly when one of said conditions is first met.

Preferably, in a standby condition of the coded information reader, the first camera assembly is configured to perform object presence detection by periodically checking object presence in a first phase wherein the first camera assembly is used with a resolution lower than said first resolution and a frame rate higher than said first frame rate and, in case of object detection in said first phase, to switch to a second phase, wherein object presence detection is verified by using the first camera assembly set with said first resolution and said first frame rate. This advantageously enables to optimize the time required to perform object presence detection.

Preferably, the first camera assembly is configured to start the determination of the operating parameters and the coded information decoding after object presence is detected in said first phase.

Preferably, the second camera assembly is on, in a status wherein it does not perform frame acquisition but it is "ready to acquire" until triggered by the first camera assembly.

Preferably, the first camera assembly comprises at least one of an infrared illuminator and a far-red illuminator.

Preferably, said object presence detection is performed by using said at least one of infrared illuminator and far-red illuminator.

Preferably, in the first phase of object presence detection, said at least one of infrared illuminator and far-red illuminator is turned on in a flashing mode. This advantageously enables to optimize power consumption and reduce blurring in the image.

Preferably, in the second phase of object presence detection, said at least one of infrared illuminator and far-red illuminator is kept continuously on.

The coded information reader preferably comprises at least one visible-light illuminator.

Preferably, at least one among said operations of determination of operating parameters, localization of coded information position and determination of coded information speed is performed with said visible-light illuminator.

Preferably, the illumination level for the first camera assembly and for the second camera assembly is the illumination level of said at least one visible-light illuminator.

Preferably, in case coded information decoding performed by the second camera assembly is unsuccessful, the coded information reader is configured to acquire frames with both the first camera assembly and the second camera assembly and to process them together so as to determine distance of the coded information and to perform coded information decoding, based on the frames acquired by the second camera assembly, only when the determined distance reaches a determined value.

Further characteristics and advantages of the present invention will become clear from the following detailed description of some example embodiments thereof, provided just as non-limiting examples, said description being made with reference to the attached drawings, in which.

Figure 1:
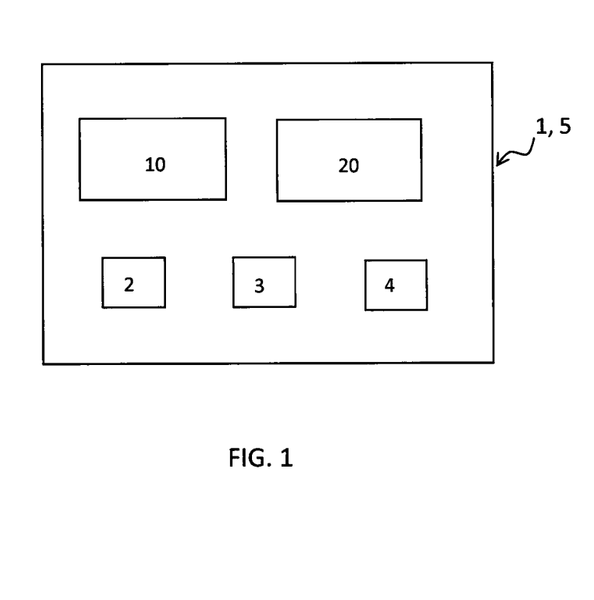
FIG. 1 schematically shows a coded information reader according to the invention.

FIG. 1 shows a coded information reader 1 according to the invention, comprising a housing 5 with a transparent window (not shown). The housing 5 houses a first camera assembly 10, a second camera assembly 20, a speaker 2, a lighting device 3, and a user interface 4.

Preferably, the coded information reader 1 is a fixed position reader, intended to fixedly rest in a predetermined position. More preferably, the coded information reader 1 is a presentation scanner. Objects (not shown) with coded information 6 (shown in FIG. 6) to be read by the reader 1 are grabbed by a user (e.g. a cashier) and moved towards the terminal reading face (corresponding to the transparent window).

The first camera assembly 10 and a second camera assembly 20 comprise each an imaging sensor, a processing unit, a lighting system and an optical system (optical lenses and/or mirrors). The imaging sensors of the two camera assemblies 10, 20 are different and separate, while the processing unit, the lighting system and the optical system may be all separate or at least in part shared.

Figure 3:
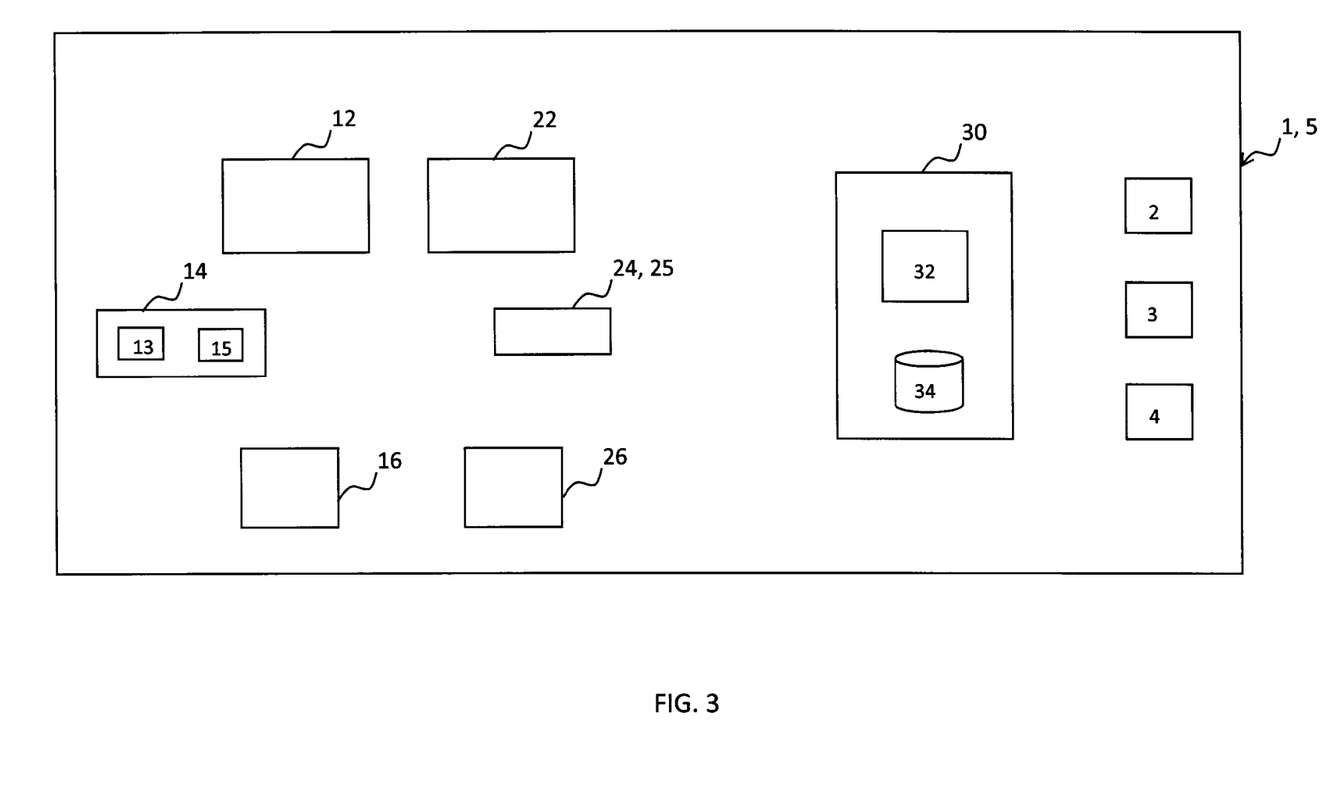
FIG. 3 schematically shows an embodiment of the coded information reader of FIG. 1.

For example, in the embodiment shown in FIG. 3, the two camera assemblies 10, 20 have separate imaging sensors, lighting systems and optical systems, and a common processing unit. In particular, the first camera assembly 10 and the second camera assembly 20 respectively comprise a first imaging sensor 12 and a second imaging sensor 22, a first lighting system 14 and a second lighting system 24, a first optical system 16 and a second optical system 26 and a single shared processing unit 30.

The first imaging sensor 12 and the second imaging sensor 22 are 2D sensor arrays, having pixels arranged in rows and columns.

The first imaging sensor 12 and the second imaging sensor 22 respectively have a first (low) resolution and a second (high) resolution, higher than the first resolution. The first imaging sensor 12 and the second imaging sensor 22 respectively have a first frame rate and a second frame rate, lower than the first frame rate.

The first imaging sensor 12 preferably is a global shutter sensor. The first imaging sensor 12 is, for example, a video graphic array (VGA) sensor with a resolution of 640×480 pixels. For example, the first frame rate of the first imaging sensor 12 is equal to 100 fps or 120 fps (frame per second).

The second imaging sensor 22 preferably is a global shutter mega pixel array sensor, for example with a resolution of 1280×1024 pixels. For example, the second frame rate of the second imaging sensor 22 is equal to 45 fps or 60 fps (frame per second). The mega pixel array sensor may be, for example, a charged coupled device (CCD) or a complementary oxide semiconductor (CMOS).

The first optical system 16 and the second optical system 26 comprise each suitable optical lenses and/or mirrors (not shown) adapted to define a first field of view 18 and a second field of view 28 (shown in FIG. 2), respectively. The first field of view 18 and the second field of view 28 substantially have a pyramidal shape. Frames of objects in transit within the first field of view 18 and the second field of view 28 are acquired by the first imaging sensor 12 and the second imaging sensor 22, respectively.

Figure 2:
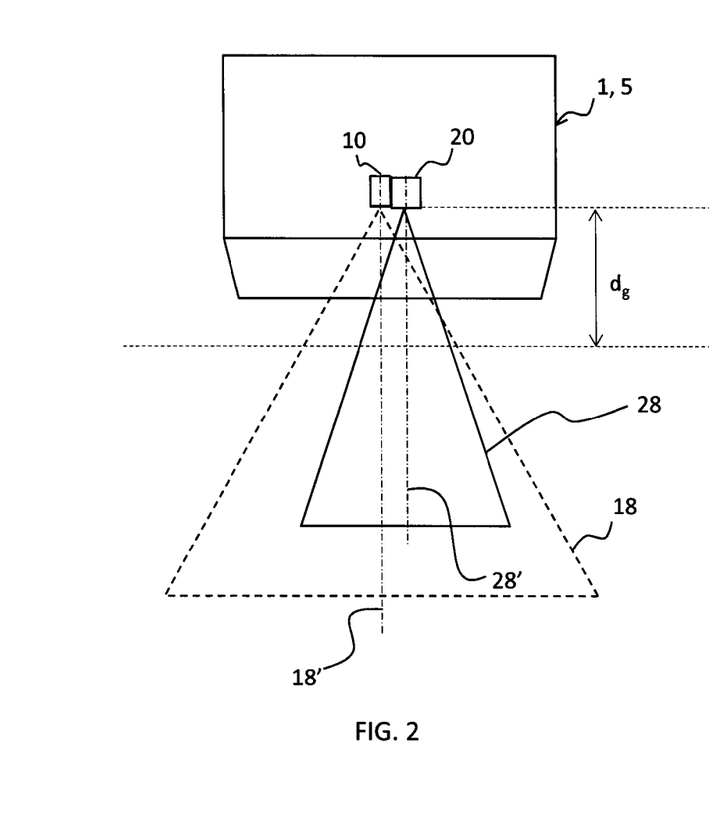
FIG. 2 schematically shows a first field of view and a second field of view according to an embodiment of the coded information reader of FIG. 1.
Figure 6:
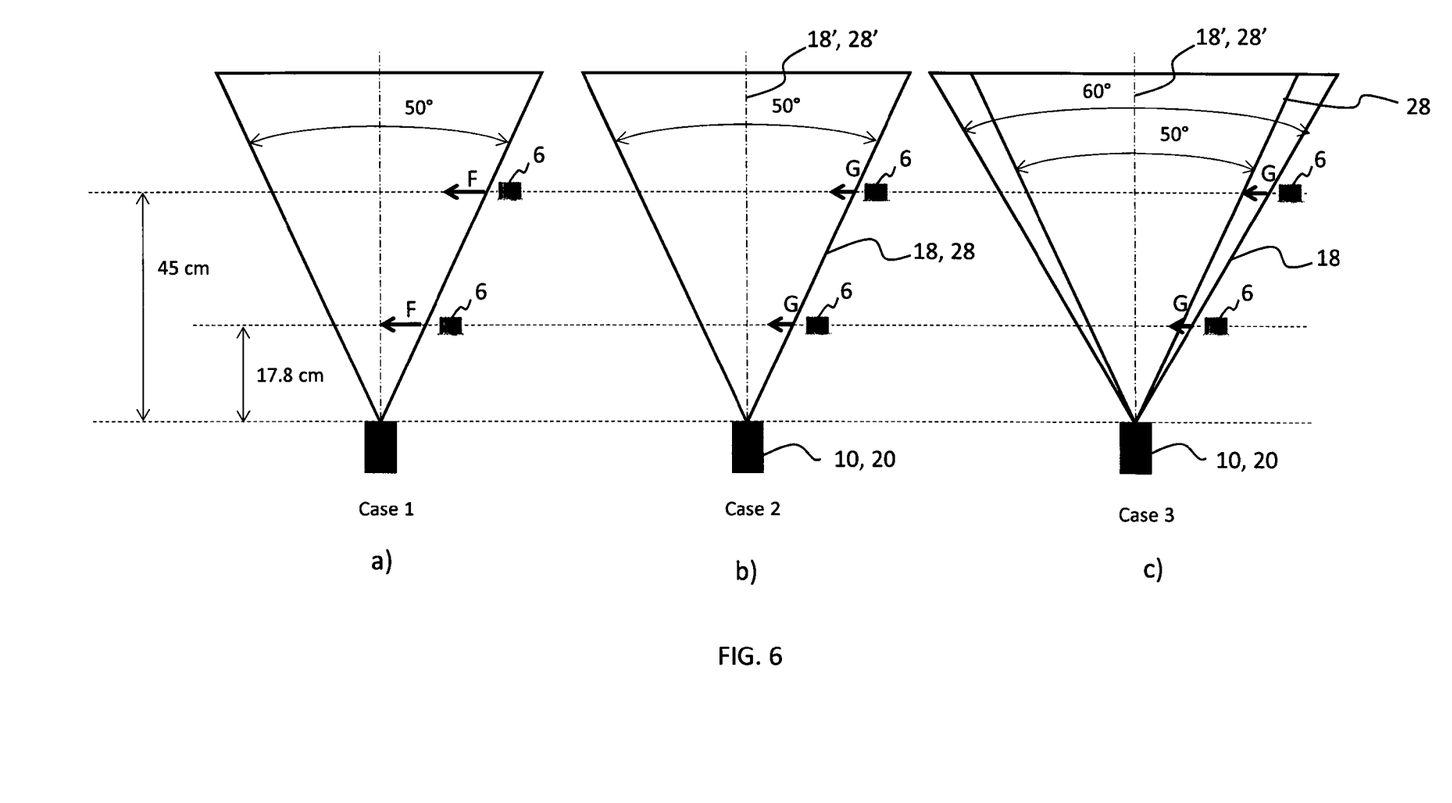
FIG. 6 schematically shows three examples of response times for high resolution decoding.

In the preferred embodiment shown in FIGS. 2 and 6c, the second field of view 28 is smaller than the first field of view 18 and is substantially comprised within the first field of view 18. In particular, upon exiting the transparent window of the housing 5, a major part of the (or preferably almost the whole) second field of view 28 is within the first field of view 18. Moreover, as shown in FIGS. 2 and 6c, the optical axis 28' of the second field of view 28 is substantially parallel to and close to or coincident with the optical axis 18' of the first field of view 18 so that the second field of view 28 is almost centered within the first field of view 18. For example, the second field of view 28 may be equal to 50° or 40°. For example, the first field of view 18 can be 20% bigger than the second field of view 28.

According to another embodiment (shown in FIG. 6b), the second field of view 28 and the first field of view 18 have substantially the same size and are fully or in a major part overlapping upon exiting the transparent window of the housing 5.

The embodiments of FIGS. 2, 6c and 6b advantageously enable the bar code reader 1 to read coded information 6 from objects entering the field of views 18, 28 from any direction.

The first lighting system 14 comprises an infrared illuminator 13 and a visible-light illuminator 15.

In alternative or in addition to the infrared illuminator 13, the first lighting system 14 can comprise a far red illuminator (not shown) corresponding to the $O_2$ hole of the solar spectrum, this in order to improve object detection performances even if the coded information reader 1 is placed in a position in front of a window, so receiving sun light radiations.

The second lighting system 24 comprises a visible-light illuminator 25. The visible-light illuminator 25 of the second lighting system 24 preferably is the same as the visible-light illuminator 15 of the first lighting system 14. In FIG. 3 they are shown as distinct.

The processing unit 30 comprises a processor 32 and a memory 34. The processing unit 30 may also comprise suitable filter(s) and/or analog to digital converter and/or amplifier circuitry (not shown). In an embodiment, at least part of the filter(s), analog to digital converter and amplifier circuitry are part of the first imaging sensor 12 and the second imaging sensor 22.

The first imaging sensor 12 and the second imaging sensor 22 are associated with a control circuit (not shown) for adjusting the exposure time of the first imaging sensor 12 and the second imaging sensor 22 and the gain of the amplifier circuitry. The control circuit may be part of the imaging sensors and/or of the processing unit 30.

The processing unit 30 has a dual camera interface (that is, two data links) to download frames from the first imaging sensor 12 and the second imaging sensor 22. In an alternative embodiment (not shown), the processing unit 30 can have a single data link with a multiplexer.

Figure 5:
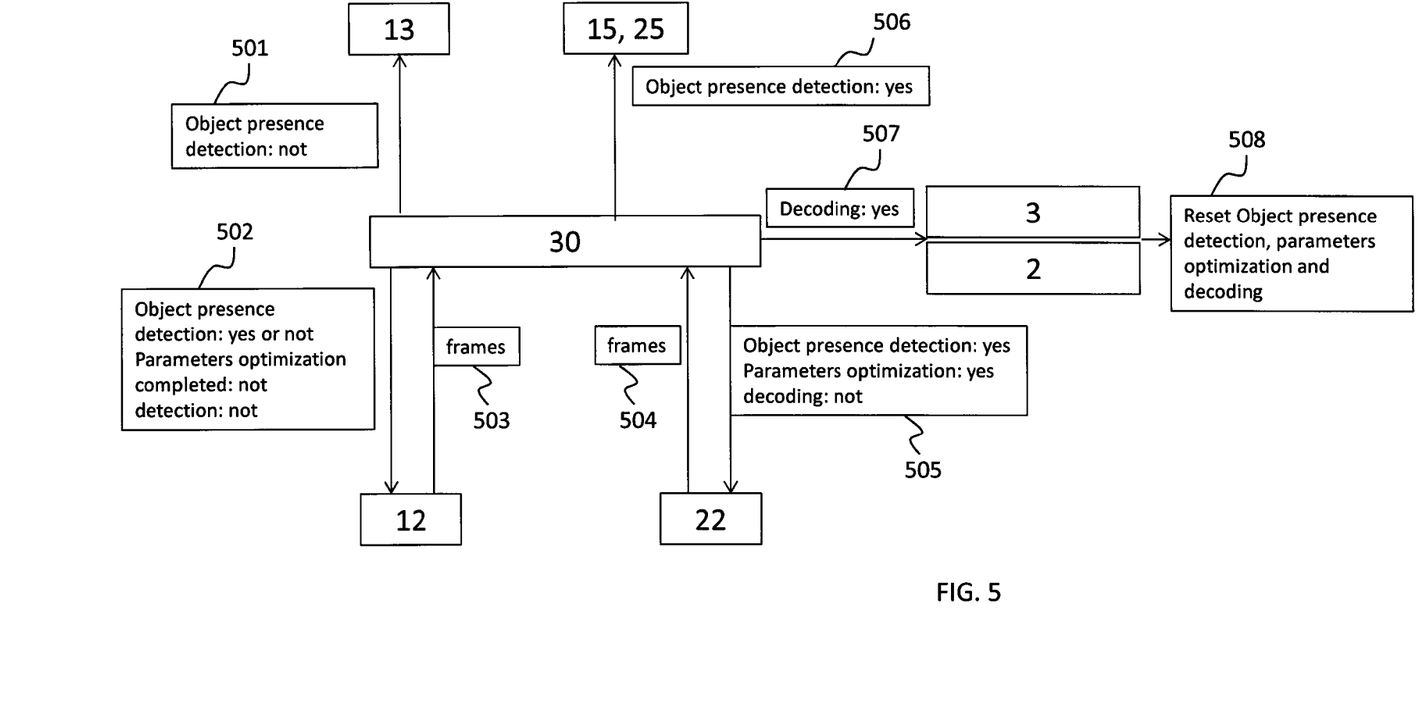
FIG. 5 schematically shows the interactions of components of the coded information reader of FIG. 3 during the operation of FIG. 4.

As schematically shown in FIG. 5, in the coded information reader 1, the first camera assembly 10 is configured to provide the following functions:
  detecting object presence by using the infrared and/or far red illuminator 13 (block 501) and by acquiring frames from the first imaging sensor 12 (blocks 502, 503), and, in case of object presence detected:
    turning the visible-light illuminator 15 on (block 506) and the infrared and/or far red illuminator 13 off;
    acquiring frames from the first imaging sensor 12 for determining operating parameters for the first camera assembly 10 and also for the second camera assembly 20 and trying to decode coded information 6 (blocks 502, 503);
    and, in case of failure:
      activating the second camera assembly 20, which performs coded information decoding, with the visible-light illuminator 25 on and with the operating parameters set as determined by the first camera assembly 10 (blocks 504, 505, 506).

In case of successful coded information decoding either by the first camera assembly 10 or the second camera assembly 20 (block 507), the reader 1 outputs a green spot and a beep sound via the speaker 2 and the lighting device 3, and resets operation (block 508).

Figure 4:
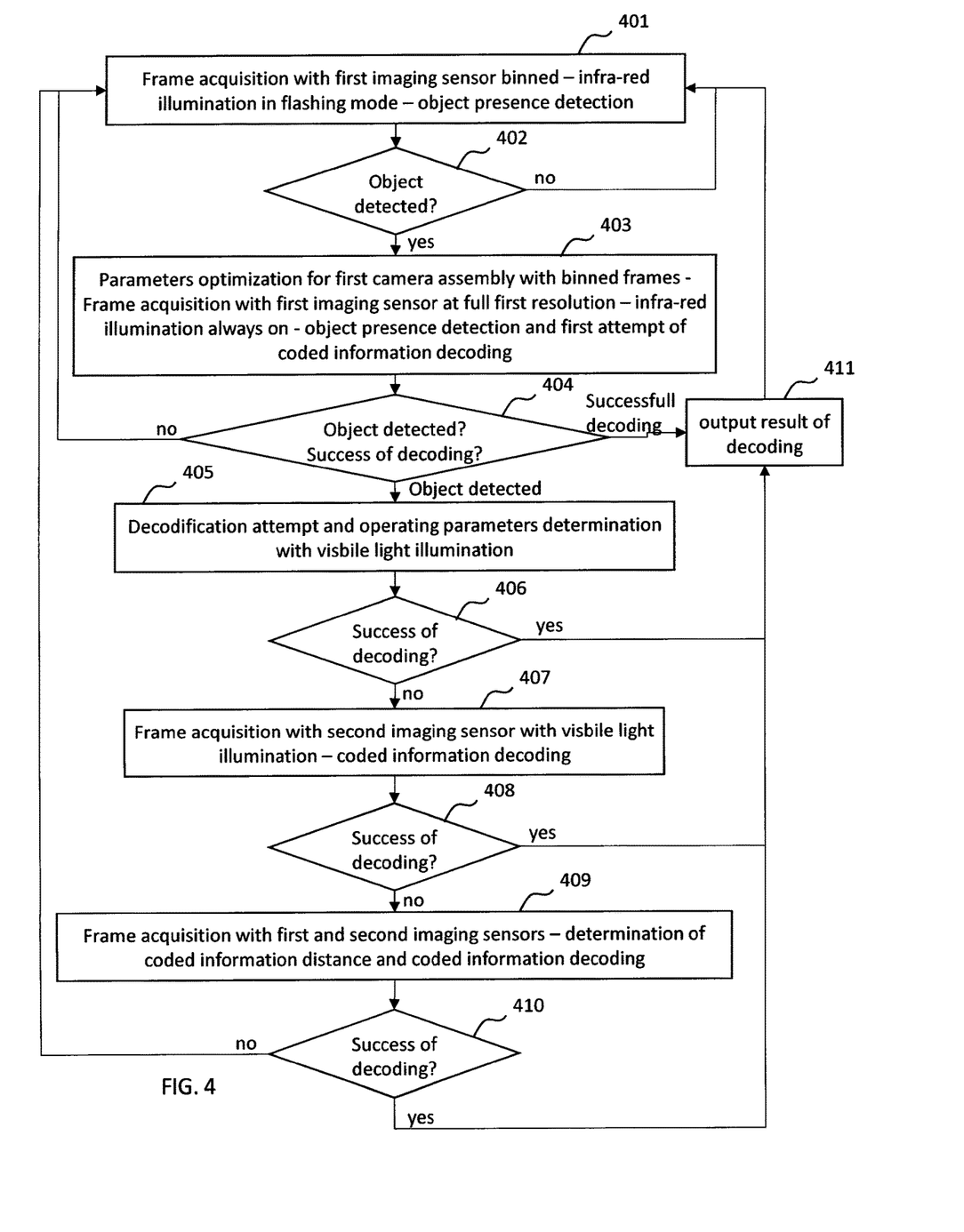
FIG. 4 shows a flow chart describing an example of operation of the coded information reader of FIG. 3.

In the following, the operation of the coded information reader 1 will be explained more in detail with reference to the flow chart of FIG. 4 and to the embodiment of FIGS. 2 and 3.

In a standby mode of the reader 1 (block 401 of FIG. 4), the second imaging sensor 22 is inactive (that is, powered on without acquiring frames, but ready to acquire) while the first imaging sensor 12 is active to acquire frames and to send them to the control unit 30 to perform object presence detection on the basis of the acquired frames. The infrared illuminator and/or the far red illuminator 13 is (are) working and the visible light illuminator(s) 15, 25 is (are) switched off. The first imaging sensor 12 is preferably binned so as to use it at a lower resolution with respect to said first resolution and at a faster speed. Typical values could be QVGA (320×240 pixels) at 180 fps with binning, or QQVGA (160×120 pixels) at 360 fps with binning.

Moreover, the infrared illuminator and/or the far red illuminator 13 is (are) turned on periodically, only for a short time, in flashing mode. This advantageously enables to save power consumption. Moreover, the use of infrared illuminator and/or far red illuminator 13 advantageously enables to perform object presence detection without the user being aware of it and, thus, without bothering him/her.

The reader 1 operates in this first phase of object presence detection (block 401) until at block 402 some significant changes of the brightness are detected in the binned acquired frames by the control unit 30. In this case, the coded information reader 1 passes into a second phase of object presence detection (block 403).

In this second phase, the control unit 30 sets the operating parameters of the first camera assembly 20 using information coming from the binned frames acquired in the first phase (typically 2 frames). Thereafter, with the operating parameters set in this way, the first imaging sensor 12 acquires frames at its full resolution (i.e. the said first resolution) and sends them to the control unit 30 to verify object presence detection on the basis of the frames thus acquired (typically 1 frame) and, at the same, to make a first attempt of coded information decoding. In this second phase, the infrared illuminator and/or the far red illuminator 13 is (are) kept continuously on. Purpose of this second phase is to evaluate more deeply the presence of a moving object into the field of view 18 of the first camera assembly 10 and to make, at the same, the first attempt of decoding. At block 404, it is checked the success of object presence detection and of coded information decoding. If they are both successful, the reader 1 returns to block 401 via block 411, wherein the result of the decoding is outputted (for example through the speaker 2, the lighting device 3 and/or the user interface 4). If presence of a moving object is detected (with unsuccessful coded information decoding), the reader 1 passes to block 405. On the other side, if no moving object is detected, the reader 1 carries on the second phase of block 403 for a predetermined time; thereafter it returns to block 401.

It is observed that the splitting of the object presence detection is said first phase of block 401 and said second phase of block 403 advantageously enables to optimize processing time and power consumption required by object presence detection operation. Moreover, the second phase of block 403 enables to improve the efficiency of object presence detection avoiding to erroneously turn visible light on (and consequently distract customer) when no moving object (or coded information 6) is actually present in the field of view 18.

At block 405, the infrared illuminator and/or the far red illuminator 13 is (are) turned off and the visible-light illuminator 15 of the first camera assembly is turned on. Moreover, the first imaging sensor 12 acquires frames and sends them to the control unit 30 in order to simultaneously:
  try to decode coded information 6 (according to algorithms known in the art),
  analyse the pixels of the first imaging sensor 12 covering the first field of view 18 of the first camera assembly 10 in order to determine the operating parameters thereof,
  analyse the pixels of the first imaging sensor 12 covering the second field of view 28 of the second camera assembly 20 in order to determine the operating parameters thereof.

The operating parameters are on of: gain of the amplifier circuitry, exposure time of the first or second imaging sensor 12, 22, object illumination level, or any combination thereof. The object illumination level relates to the status (on/off) of the visible-light illuminator 15, 25 and to its degree of illumination. Depending on the ambient light conditions, it may be suitable to keep the visible-light illuminator 15, 25 off (for example, if the object is already illuminated by a proper illuminator such as in the case of the screen of a mobile phone displaying coded information 6 to be read) or to properly adjust the illumination level of the illuminator.

At block 405, the operating parameters for the second camera assembly 20 are in particular obtained by:
  analysing the pixels of the first imaging sensor 12, which cover the second field of view 28 of the second camera assembly 20, in order to determine intermediate values for the operating parameters, and
  deriving actual values for the operating parameters of the second camera assembly 20 from the determined intermediate values by using suitable conversion parameters, which may be established thanks to a suitable calibration procedure that may be performed in a manufacturing stage or an initial set-up phase of the reader 1.

Preferably, at block 405, the control unit 30 also tries to localize, according to techniques that are within the skills of a person skilled in the art, coded information position and/or coded information speed.

At block 406, it is checked the success of the attempt for coded information decoding. If coded information 6 is decoded, the reader 1 returns to block 401 via block 411, wherein the result of the decoding is outputted. On the other side, if no coded information 6 is decoded, the reader 1 carries on the attempt of coded information decoding at block 405 till a first one of the following conditions is met: lapse of a predetermined time from object detection or coded information position approaching (or entering) the field of view 28 of the second camera assembly 20 (this latter condition being used only when the coded information position is localized at block 405). Thereafter, at block 407, the control unit 30 activates the second imaging sensor 22 to acquire frames, with the operating parameters thereof set as determined at block 405. At the same time, the first imaging sensor 12 stops acquiring frames. Moreover, the control unit 30 processes the frames acquired by the second imaging sensor 22 to decode coded information 6.

When coded information position and/or coded information speed have been determined at block 405, this information will be used by the control unit 30 in order to quickly localize coded information position into the first frame acquired by the second imaging sensor 22 and analyse only a small portion of said frame.

At block 408, it is checked the success of coded information decoding performed on the basis of frames acquired by the second imaging sensor 22. If coded information is decoded, the reader 1 returns to block 401 via block 411. On the other side, if no coded information 6 is decoded, the reader 1 carries on the attempt of coded information decoding at block 407 for a predetermined time. Thereafter, at block 409, the control unit 30 activates both the first imaging sensor 12 and the second imaging sensor 22 to acquire frames and performs a triangulation calculation (if needed projecting a spot light pattern during acquisition) in order to estimate distance (and raw estimation of the resolution) of the coded information 6. If the control unit 30 finds that distance and resolution of the coded information 6 are too much challenging for being decoded on the basis of frames from the second (high resolution) imaging sensor 22, then the reader 1 will stay in this intermediate mode wherein frames from both imaging sensors 12, 22 are processed in order to estimate distance of the coded information 6. Once the distance is not so challenging, the control unit 30 tries to decode the coded information 6 on the basis of frames acquired from the second (high resolution) imaging sensor 22 only.

At block 410, it is checked the success of coded information decoding. If coded information 6 is decoded, the reader 1 returns to block 401 via block 411. On the other side, if no coded information 6 is decoded, the reader 1 carries on the attempt of coded information decoding at block 409 for a predetermined time. Thereafter, it returns directly to block 401.

As schematically shown in FIG. 2, for any specific coded information moving velocity, the reader 1 can guarantee decoding capability over a specific minimum distance from the vertex of the pyramidal field of view, hereinafter named "guaranteed distance" $d_g$. For distances lower than the guaranteed distance $d_g$, the reader 1 is not able to guarantee decoding capability. The more reactive is the reader 1, (that is, the faster is the reader 1 in decoding coded information 6), the shorter is the guaranteed distance $d_g$.

The Applicant estimated the guaranteed distance $d_g$ for two different readers, considering the guaranteed distance $d_g$ as the distance from the vertex of the pyramidal field of view at which, for a specific coded information moving velocity, the coded information 6 reaches the optical axis 28' of the second field of view 28 at the time the high resolution coded information decoding starts.

For comparison purposes, the Applicant estimated the guaranteed distance $d_g$ of a reader based on a single (high resolution) camera by using the following formula:

$$d_g = MV * ((N_{pre}/FR_{pre}) + ((N_{dec}-1)/FR_{dec}))/(\tangent (FOV_{HR}/2))$$

wherein:
  MV=the coded information moving velocity
  $FOV_{HR}$=is the field of view of the high resolution camera
  $N_{pre}$=needed frames in order to perform object presence detection and optimization of operating parameters $N_{dec}$=needed frames (considering operating parameters already optimized) in order to perform coded information decoding $FR_{pre}$=is the frame rate used during object presence detection and optimization of operating parameters $FR_{dec}$=is the frame rate used during coded information decoding The Applicant also estimated the guaranteed distance $d_g$ for a reader made according to the invention, using both a first (low resolution and fast) camera assembly 10 and a second (high resolution) camera assembly 20, by using the following formula:

$$d_g = MV*((N_{pre}/FR_{pre}) + ((N_{dec}-1)/FR_{dec}))/(\tangent(FOV_{FC}/2))$$

where $FOV_{FC}$ is the first filed of field of view 18 of the first (fast) camera assembly 10.

Tables 1 and 2 below show the values of $d_g$ obtained by using the above formulas for the three following cases:

Case 1: reader with a single HR camera (mega pixel sensor with array size of 1280×1024 pixels with a frame rate of 45 fps) making coded information decoding at full resolution, while performing object presence detection and operating parameters optimization at lower resolution (640× 480 pixels) and higher frame rate (60 fps), by using the HR camera binned in VGA resolution;

Case 2: reader according to the invention wherein the first of view 18 and the second field of view 28 are substantially the same and overlap ($FOC_{FC}$=$FOV_{HR}$);

Case 3: reader according to the invention wherein the first of view 18 is 20% bigger than the second field of view 28 ($FOC_{FC}$=1.2*$FOV_{HR}$).

The $d_g$ values of table 1 have been calculated using the following values:

$FOV_{HR}$=50°; $N_{pre}$=5 (2 for object presence detection and 3 for operating parameters optimization); $N_{dec}$=1; $FR_{dec}$=45 fs (considering a mega pixel sensor 1280×1024 pixels); $FR_{pre}$=100 fs (for cases 2 and 3, considering a VGA sensor 640×480 pixels); $FR_{pre}$=60 fs (for case 1, considering the mega pixel sensor binned in VGA configuration).

The $d_g$ values of table 2 are calculated using the same values used for the table 1 apart from the $FOV_{HR}$ value that, in this case, is 40°.

TABLE 1

| | $d_g$ (cm) | | |
|---|---|---|---|
| MV (m/s) | Case 1 | Case 2 | Case 3 |
| 4 | 71 | 43 | 35 |
| 3 | 54 | 32 | 26 |
| 2 | 36 | 21 | 17 |
| 1 | 18 | 11 | 9 |

TABLE 2

| | $d_g$ (cm) | | |
|---|---|---|---|
| MV (m/s) | Case 1 | Case 2 | Case 3 |
| 4 | 92 | 55 | 45 |
| 3 | 69 | 41 | 34 |
| 2 | 46 | 27 | 22 |
| 1 | 23 | 14 | 11 |

For the above cases the Applicant also calculated the response time for high resolution decoding (as the processing time necessary for performing object presence detection and operating parameters determination before starting coded information decoding by the high resolution sensor). The following values were obtained by considering a coded information moving velocity of 1 m/s:

83 ms for case 1 (which becomes 133 ms taking into account a waste of time corresponding to about three frames for switching the mega pixel sensor from binned configuration into full resolution configuration);

50 ms for cases 2 and 3.

These results are schematically represented in FIG. 6 wherein the horizontal arrows F, G schematically represent the path covered by a coded information 6 in the response time, respectively in case 1 (arrow F) and in cases 2-3 (arrow G). The longer is the arrow, the longer is the covered path and, thus, the response time. From FIG. 6c, it can be observed that for case 3 (wherein the first field of view 18 is bigger than and comprises the second field of view 28) the farer is the coded information 6 the higher is the path covered within the first field of view 18 of the first imaging sensor 12. For example, considering a coded information 6 at a distance of 17.8 cm from the vertex of the pyramidal field of view, the Applicant calculated that for the reader of case 3, Table 1, of said 50 ms of response time, 13 ms are spent in the first field of view 18 of the first imaging sensor 12 while 37 ms are spent in the second field of view 28 of the second imaging sensor 22 (situation represented by the arrow G below in FIG. 6c, crossing both field of views 18, 28). On the other hand, considering a coded information 6 at a distance of 45 cm from the vertex of the pyramidal field of view, the Applicant calculated that for the reader of case 3, Table 1, the whole response time of 50 ms is spent in the first field of view 18 of the first imaging sensor 12 (situation represented by the upper arrow G in FIG. 6c, crossing only field of view 18).

Accordingly, the results of the above calculations show that the reader 1 of the invention (cases 2 and 3) is more reactive (that is, faster in decoding coded information 6) and provides a shorter guaranteed distance $d_g$. The invention thus enables to improve responsivity of the reader 1 while preserving high resolution capabilities.

Moreover, the embodiment of case 3, wherein the first field of view 18 is bigger than and comprises the second field of view 28, enables to obtain an even shorter guaranteed distance $d_g$. The responsivity of the reader 1 is thus further improved, still preserving high resolution capabilities. Indeed, as schematically shown in FIG. 6c, this latter embodiment advantageously enable to have—as a whole—a bigger field of view and to exploit a part of or the whole first field of view 18 of the first (fast) camera assembly to perform object presence detection and operating parameters optimization. The second field of view 28 of the second camera assembly 20 can thus be in a major part or fully exploited only for coded information decoding (without wasting any time to carry out said operations). In these cases, the Applicant estimates that, on average, coded information decoding can be already carried out at the first frame taken by the second (high resolution) imaging sensor 22.

It is observed that the optimal value $FOV_{FC}$ for the first filed of field of view 18 of the first camera assembly 10 depends on the decoding capability of the first camera assembly 10. In particular, it shall be a trade-off between two effects:

bigger $FOV_{FC}$ means more reactive reader and consequently shorter guaranteed distances $d_g$;

smaller $FOV_{FC}$ means bigger decoding depth of field of the first camera assembly 10 and, consequently, more decoding support to second camera assembly 20 in order to speed up decoding of low resolution coded information 6. Preferably, the ratio between the first field of view and the second field of view is comprised between 1 and 1.5 ($1 \leq FOV_{FC}/FOV_{HR} \leq 1.5$).

The invention claimed is:

1. A coded information reader for reading coded information from an object, comprising:
a first camera assembly having a first resolution, a first frame rate, and a first field of view, wherein the first camera assembly includes a first imaging sensor, a first processing unit, a first lighting system, and a first optical system; and
a second camera assembly, separate and distinct from the first camera assembly, the second camera assembly having a second resolution, a second frame rate, and a second field of view, the first resolution being lower than the second resolution and the first frame rate being higher than the second frame rate, wherein the second camera assembly includes a second imaging sensor, a second processing unit, a second lighting system, and a second optical system,
wherein the first camera assembly is configured to acquire frames and to process the acquired frames to perform:
(1) detection of object presence,
(2) determination of operating parameters for both the first camera assembly and the second camera assembly,
(3) coded information decoding, and
(4) in case of failure of the coded information decoding, triggering of the second camera assembly to acquire frames and to process the acquired frames to perform coded information decoding with the operating parameters set as determined by the first camera assembly for the second camera assembly, wherein the operating parameters for the second camera assembly are determined by analyzing pixels of the frames acquired by the first camera assembly, which cover the second field of view, in order to determine intermediate values and deriving actual values for the operating parameters of the second camera assembly using predetermined conversion parameters,
wherein, in a standby condition of the coded information reader, the first camera assembly is configured to perform object presence detection by periodically checking object presence in a first phase wherein the first camera assembly is used with a resolution lower than the first resolution and a frame rate higher than the first frame rate and, in case of object detection in the first phase, to switch to a second phase, wherein object presence detection is verified by using the first camera assembly set with the first resolution and the first frame rate.

2. The coded information reader according to claim 1, wherein the operating parameters include at least one of gain, exposure time, or illumination level.

3. The coded information reader according to claim 1, wherein the second field of view is smaller than the first field of view.

4. The coded information reader according to claim 3, wherein a major part of the or substantially the whole second field of view is comprised within the first field of view.

5. The coded information reader according to claim 1, wherein the first camera assembly is configured to perform at least one operation among: localization of coded information position and determination of coded information speed.

6. The coded information reader according to claim 5, wherein the second camera assembly is configured to perform coded information decoding by using the coded information position localized by the first camera assembly or by using the coded information speed determined by the first camera assembly.

7. The coded information reader according to claim 1, wherein the first camera assembly is configured to trigger the second camera assembly when the object enters or approaches the second field of view of the second camera assembly or after lapse of a predetermined period of time from object presence detection.

8. The coded information reader according to claim 1, wherein, the first camera assembly comprises at least one of an infrared illuminator and a far-red illuminator and in the first phase of object presence detection, the at least one of infrared illuminator and far-red illuminator is turned on in a flashing mode.

9. The coded information reader according to claim 8, wherein in the second phase of object presence detection, the at least one of infrared illuminator and far-red illuminator is kept on continuously.

10. A coded information reader for reading coded information from an object, comprising:
a first camera assembly having a first resolution, a first frame rate, and a first field of view; and
a second camera assembly having a second resolution, a second frame rate, and a second field of view, the first resolution being lower than the second resolution and the first frame rate being higher than the second frame rate,
wherein the first camera assembly is configured to acquire frames and to process the acquired frames to perform:
(1) detection of object presence,
(2) determination of operating parameters for both the first camera assembly and the second camera assembly,
(3) coded information decoding, and
(4) in case of failure of the coded information decoding, triggering of the second camera assembly to acquire frames and to process the acquired frames to perform coded information decoding with the operating parameters set as determined by the first camera assembly for the second camera assembly,
wherein, in case coded information decoding performed by the second camera assembly is unsuccessful, the coded information reader is configured to acquire frames with both the first camera assembly and the second camera assembly and to process them together so as to determine distance of the coded information and to perform coded information decoding, based on the frames acquired by the second camera assembly, only when the determined distance reaches a determined value.

11. The coded information reader according to claim 10 wherein the first camera assembly is configured to perform at least one operation among: localization of coded information position and determination of coded information speed.

12. The coded information reader according to claim 11, wherein the second camera assembly is configured to perform coded information decoding by using the coded information position localized by the first camera assembly or by using the coded information speed determined by the first camera assembly.

13. The coded information reader according to claim 12, wherein the first camera assembly is configured to trigger the second camera assembly when the object enters or approaches the second field of view of the second camera assembly or after lapse of a predetermined period of time from object presence detection.

14. The coded information reader according to claim 13, wherein, in a standby condition of the coded information reader, the first camera assembly is configured to perform object presence detection by periodically checking object presence in a first phase wherein the first camera assembly is used with a resolution lower than the first resolution and a frame rate higher than the first frame rate and, in case of object detection in the first phase, to switch to a second phase, wherein object presence detection is verified by using the first camera assembly set with the first resolution and the first frame rate.

15. The coded information reader according to claim 12, claim 14, wherein, the first camera assembly comprises at least one of an infrared illuminator and a far-red illuminator and in the first phase of object presence detection, the at least one of infrared illuminator and far-red illuminator is turned on in a flashing mode.

16. The coded information reader according to claim 15, wherein in the second phase of object presence detection, the at least one of infrared illuminator and far-red illuminator is kept on continuously.

17. The coded information reader according to claim 16, wherein, in case coded information decoding performed by the second camera assembly is unsuccessful, the coded information reader is configured to acquire frames with both the first camera assembly and the second camera assembly and to process them together so as to determine distance of the coded information and to perform coded information decoding, based on the frames acquired by the second camera assembly, only when the determined distance reaches a determined value.

18. A method for reading coded information from an object, comprising the steps of:
   a) acquiring first frames at a first resolution and at a first frame rate with a first camera assembly, wherein the first camera assembly includes a first imaging sensor, a first processing unit, a first lighting system, and a first optical system;
   b) processing the acquired first frames so as to perform the steps of:
      b1) detecting object presence, and, in case of object presence detected:
      b2) determining operating parameters for the first camera assembly and for a second camera assembly separate and distinct from the first camera assembly, wherein the second camera assembly includes a second imaging sensor, a second processing unit, a second lighting system, and a second optical system, and
      b3) decoding coded information,
   c) in case of failure of step b3) of coded information decoding, setting the operating parameters of the second camera assembly as determined in step b2) and triggering acquisition of second frames at a second resolution and at a second frame rate by the second camera assembly, the first resolution being lower than the second resolution and the first frame rate being higher than the second frame rate; and
   d) processing the second frames acquired in step c) so as to perform coded information decoding wherein, in a standby condition of the coded information reader, performing object presence detection is performed by periodically checking object presence in a first phase wherein the first camera assembly is used with a resolution lower than the first resolution and a frame rate higher than the first frame rate and, in case of object detection in the first phase, to switch to a second phase, wherein object presence detection is verified by using the first camera assembly set with the first resolution and the first frame rate,
   wherein, in a standby condition of the coded information reader, the first camera assembly performing object presence detection by periodically checking object presence in a first phase wherein the first camera assembly is used with a resolution lower than the first resolution and a frame rate higher than the first frame rate and, in case of object detection in the first phase, to switch to a second phase, wherein object presence detection is verified by using the first camera assembly set with the first resolution and the first frame rate.

19. The coded information reader of claim 1, wherein the first resolution is a full resolution for the first camera assembly, and the second resolution is a full resolution for the second camera assembly.

* * * * *